W. C. STEVENS.
MOTOR TIRE APPLYING APPARATUS.
APPLICATION FILED DEC. 16, 1915.
1,260,992.
Patented Mar. 26, 1918.
4 SHEETS—SHEET 1.
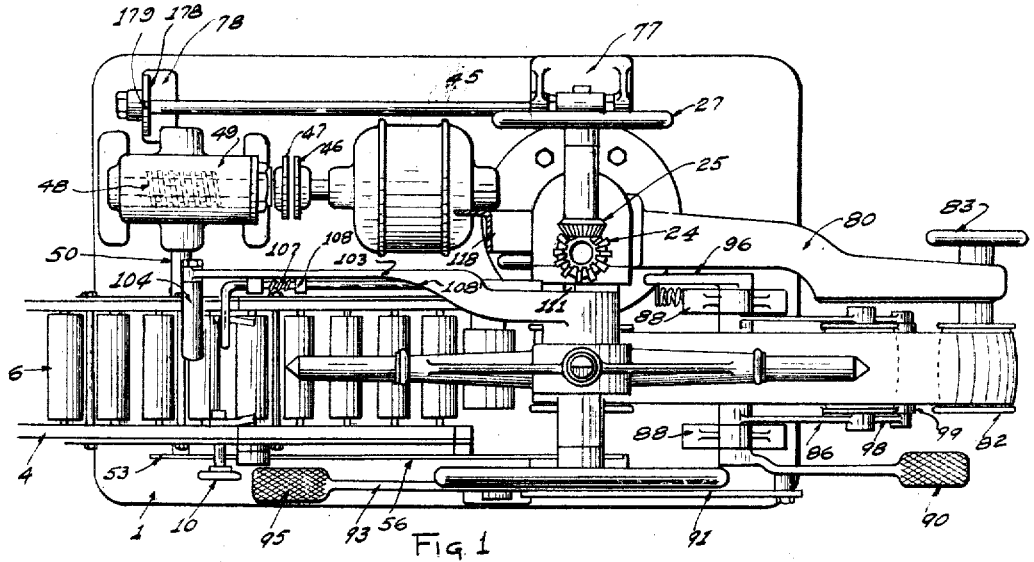
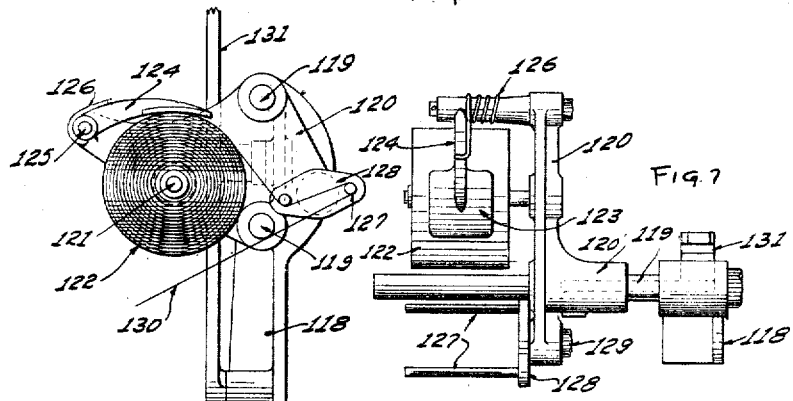
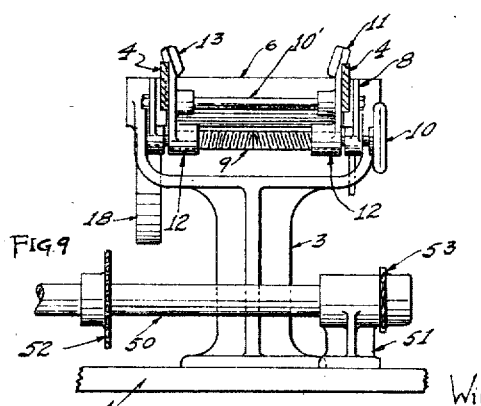
WITNESSES
Edwin J. Wright
G. L. Ely
INVENTOR.
William C. Stevens.
BY
ATTORNEY

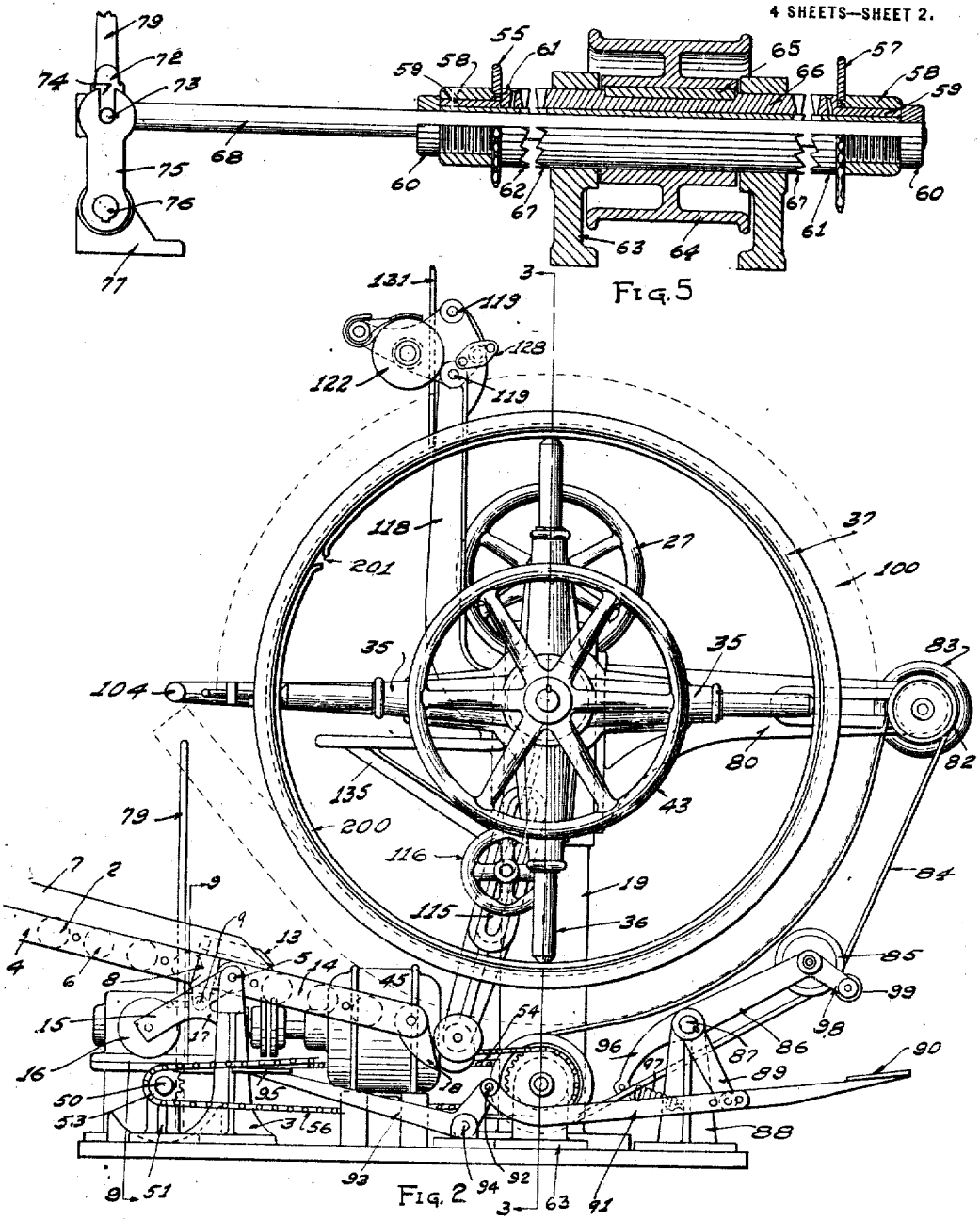

UNITED STATES PATENT OFFICE.

WILLIAM C. STEVENS, OF AKRON, OHIO, ASSIGNOR TO THE FIRESTONE TIRE & RUBBER COMPANY, OF AKRON, OHIO, A CORPORATION OF OHIO.

MOTOR-TIRE-APPLYING APPARATUS.

1,260,992.  Specification of Letters Patent.  Patented Mar. 26, 1918.

Application filed December 16, 1915. Serial No. 67,107.

*To all whom it may concern:*

Be it known that I, WILLIAM C. STEVENS, a citizen of the United States, residing at Akron, in the county of Summit and State of Ohio, have invented new and useful Improvements in Motor-Tire-Applying Apparatus, of which the following is a specification.

This invention relates to machines for use in the manufacture of solid tires and particularly of the type known as the "hard base" tire. In the manufacture of this tire a rim is usually corrugated and on the corrugations is pressed a layer of hard rubber composition. This layer is given a partial or semi cure and is then coated with a layer of rubber cement and buffed. On the cemented hard base is placed the cushion tire proper. The hard base adheres to the corrugated rim and the cushion tire in turn adheres to the cemented hard base.

It is with the manufacture and application of the cushion tire to the hard base that this invention deals. Heretofore the universal practice has been to form the cushion from a thin strip of rubber made in a calender and then wound up on the rim. After forming the tire to about the size required it was the practice to turn the rim and tire over to cutters who trimmed it to exact weight and an approximation of its finished shape by knives held against the outside edges.

By the use of this machine cushion tires which have been formed by extrusion through dies of required size and cut to the proper length are placed about the rim having the hard cemented base previously formed thereon. By the use of this machine the tedious process of building up the cushion from the calender, as well as the trimming, are eliminated.

These and other objects will appear from the following specifications and drawings in which like reference numerals refer to like parts and in which:

Figure 1, is a plan view of the apparatus.

Fig. 2, is a side elevation with a rim mounted in the spider.

Fig. 5, is an enlarged section of the rim driving mechanism.

Fig. 6, is an elevation of the wrapper holder.

Fig. 7, is a plan thereof.

Fig. 9, is a section on the line 9—9 of Fig. 2.

Figure 3:
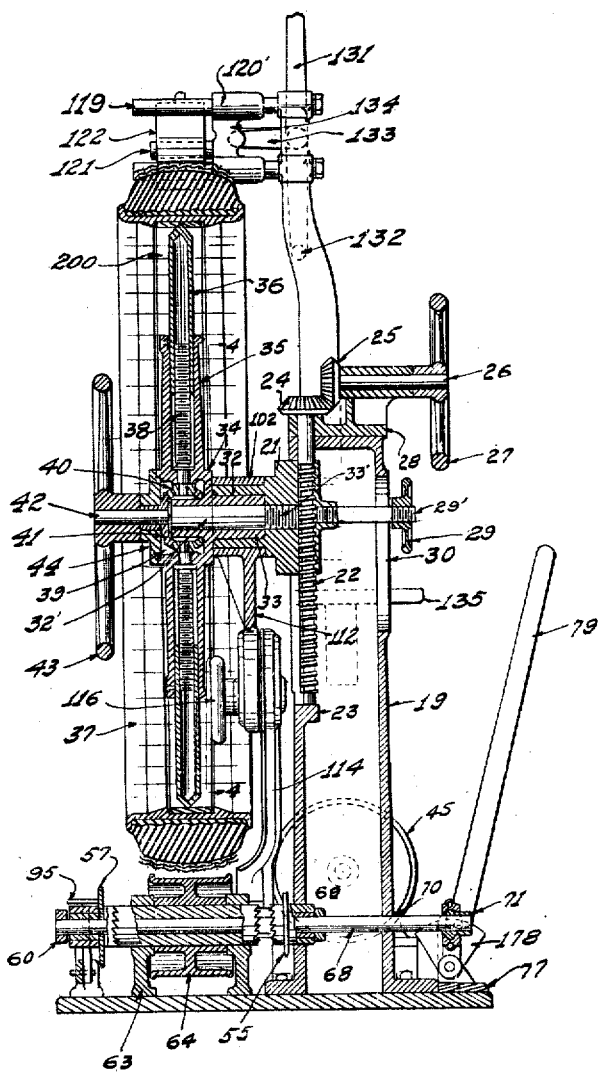
Fig. 3, is a section on the line 3—3 of Fig. 2.
Figure 4:
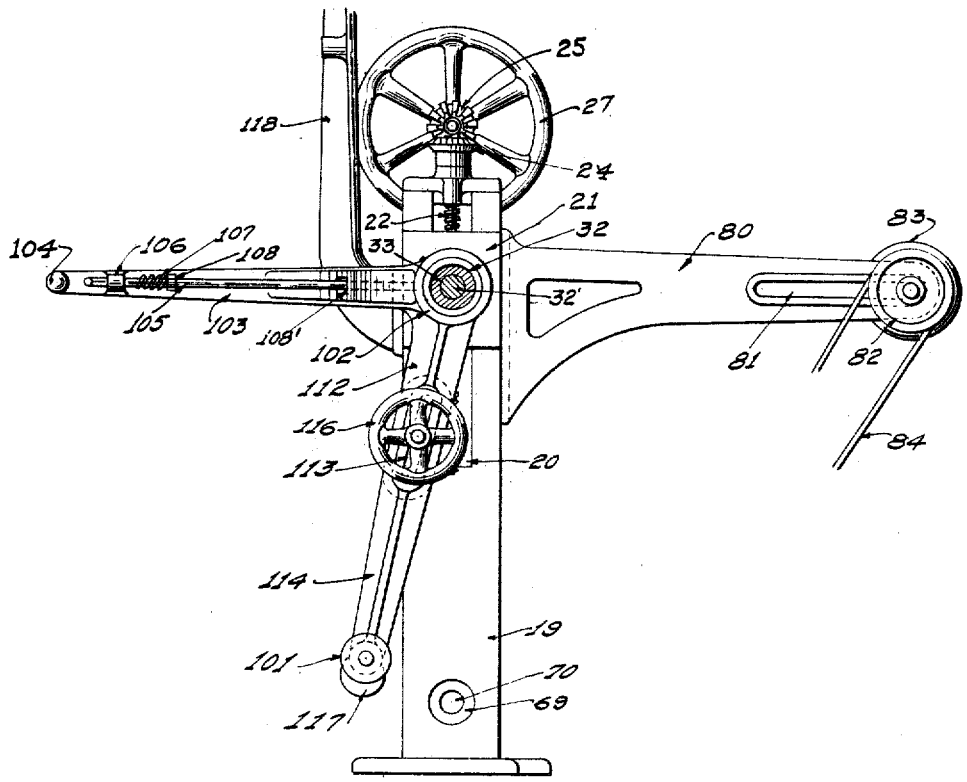
Fig. 4, is an elevation of part of the standard with the spider removed, being partly a section on the line 4—4 of Fig. 3.
Figure 8:
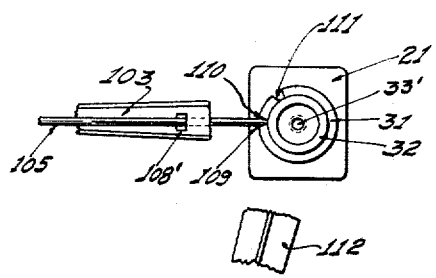
Fig. 8, is a detail.

This machine is mounted on a base 1 and comprises generally a stand and spider for holding a rim having a hardened base applied thereto, a trough in which are laid cushion tires which have been formed by expressing from a die and cut to proper length to encircle a given rim, a roller for placing the end of the tire, driving mechanism and wrapping mechanism for encircling the tire by a muslin wrapper.

One end of the main portion of the trough or feeding table 2 is mounted on a bifurcated standard or hanger 3 secured to the base, the other end being held by any suitable support not shown. The trough comprises two stringers 4, the leading ends of which are supported on a transverse shaft 5 in the upper end of the standard. Between the stringers are arranged a series of rollers 6 adapted to support the cushion tire, and on the upper edges are fastened two side rails 7. From the forward end of the stringers are suspended a pair of hangers 8 in the lower ends of which is mounted a rotary shaft 9 having reversely screw threaded portions between the hangers and a hand wheel or crank 10 at one end. Above the screw threaded shaft 9 is mounted a guide rod 10' which passes through the stringers and supports the hangers, and on the rod are slidably mounted two arms 11, the lower ends of which are formed with screw threaded enlargements 12 adapted to be actuated by the shaft 9. The upper ends of the arms are bent backwardly and form securing faces for spring guides 13. These guides are formed of spring steel and converge toward the lower end of the trough, forming directing means for the tire which are adjustable to any width and will center the tire in its proper position relative to the rim to which it is to be applied.

Below the guiding springs or fingers 13, the trough is constructed with a tiltable extension 14 which is pivotally mounted at one end on the shaft 5 and is provided with rollers for the support of the tire. Opposite the pivot 5 is secured to the swinging extension an arm 15 carrying a counter-weight 16 and a stop 17 which strikes against the standard and normally holds the extension in line with the main length of the trough. The inner rail forming the tiltable extension is extended downwardly constituting an abutment or ear 18 which is used in depressing the extension as will be explained later.

Rearwardly and at one side of the end of the swinging extension is secured to the base a hollow standard 19 which supports the rim carrying mechanism and the winding device. On the front face of the standard is a slot or guideway 20 in which is mounted a slide 21. The slide is adapted to be moved up and down in the slot by a vertical screw shaft 22 arranged back of the slot and passing through the back part of the slide. The lower end of the screw shaft is mounted in a step bearing 23 and its upper end is extended above the standard, and to it is secured a bevel pinion 24 in mesh with a bevel gear 25 on a short transverse shaft 26 carrying a hand wheel 27. The shaft 26 and the upper end of the shaft 22 are rotatably mounted in an L-shaped casting 28 secured to the top of the standard. By rotation of the hand wheel the slide is moved up or down to accommodate rims of different diameters and is locked in position by a second wheel 29 screwed on the outer end of a shaft 29' which is secured to the slide and extends through a slot 30 formed in the back of the standard in line with the shaft. The hand wheel 29 bears on the back of the standard and when screwed up tightly relieves the shaft of the weight of the spider and rim.

The front face of slide 21 is formed with a raised circular portion or abutment 31 from which extends a reduced elongated socket or bearing 32. In the center of the slide opening from the bearing is a screw threaded hole 33'.

The spider carrying the rim and tire is adapted to be rotatably mounted in the bearing 32. The center piece of the spider is formed with an elongated hub 33, one end of which is seated in the bearing on the slide. Midway of the hub is formed a web or collar 34 which rests against the outer end of the bearing and from this web are formed four tubular arms 35. The center piece of the spider is held in the socket 32 by a headed bolt 32' screwed into the hole 33' in the slide. In the outer ends of the arms are mounted to slide, but not to rotate, hollow pins 36 having sharpened ends adapted to be received in small grooves formed in the inside of an expansible chuck or clamp 200. This chuck is formed as a ring split at 201 so as to allow expansion or contraction and provided on its outer surface with a face of a suitable contour to allow the rim 37 to be seated thereon. Within the arms 35 and in screw threaded engagement with the interior of the pins 36 are a series of shafts 38, the inner ends of which are mounted for rotation in the base of the arms. On the end of each shaft 38 in the central housing of the spider is mounted a bevel pinion 40, the four pinions being in mesh with a master bevel pinion 41 secured on a short shaft 42 carrying a hand wheel 43. The master pinion is rotatably mounted in a plate 44 secured on the front of the spider and inclosing the housing.

The parts first described constitute a rotatable and expansible spider or chuck for holding a rim of any diameter in line with the center line of the trough, the height being properly adjusted for rims of different diameters by operation of the slide as has been described.

It is desirable to rotate the rim at two speeds: one speed while the tire is being applied and a faster speed while it is being wrapped. The mechanism for rotating the rim will now be described.

On the base of the machine is mounted a suitable motor 45, the armature shaft of which carries one member 46 of a clutch, the other member 47 being carried by a worm shaft 48. The clutch is shown diagrammatically and may be operated by any well known means. The worm 48 in the housing 49 operates a gear which is secured to a transverse drive shaft 50 mounted in bearings 51 in the base plate. The drive shaft carries near the housing a large sprocket 52 and at its outer end a sprocket pinion 53. From the sprocket 52 extends a sprocket chain 54 to a smaller sprocket 55 and from the sprocket 53 extends a sprocket chain 56 to a large sprocket 57. Each sprocket wheel 55 and 57 is pinned to a collar 58 which is screwed on to the reduced shank of a clutch member 59. Each sprocket is held fast by a collar 60 against a shoulder 61 of a clutch member, the inner face of the clutch being provided with teeth. Between standards 63 on the base is mounted a pulley 64 which is keyed at 65 to a sleeve 66 rotatably mounted in the standards. The ends of the sleeve are provided with clutch faces 67 which are adapted to mate with the opposed clutch faces on the clutch members 59. The clutch members and the sleeve are free to rotate on a transverse shaft 68, but are prevented from sliding by the collars 60 which are shrunk thereon. The shaft 68 is supported in the standard 19, an enlarged bearing 69 being provided in the front face of the standard for the collar 58 and a smaller bearing 70 in the rear face of the standard for the shaft. Secured to the rear end of the shaft behind the standard by a thimble 71 is a thrust collar 72 provided with oppositely positioned pins 73 which are received in slots 74 in the upper ends of a spanner lever 75. A rotary shaft 76 carries the lever 75 keyed thereto and is pivoted in a bearing plate 77 back of the standard and in a second bearing plate 78 on the corner of the base near the gear housing. At the end of the shaft is secured a hand lever 79.

It will be seen that by operation of the lever 79, either of the two movable clutch members may be thrown into engagement with the sleeve 66 which will rotate the pulley 64 at a fast or slow speed from the main drive shaft 50 by reason of the differential sprocket connections described.

The plate 78 may be provided with a sector shaped extension 178 in which is formed a notch 179, the lever 79 being provided with any suitable catch not shown for engagement in the notch to lock the clutch in neutral position if desired.

To the upper end of the standard 19 is secured an arm 80 which extends in a direction away from the feed chute. The outer extremity of the arm is slotted at 81 and in this slot a pulley 82 is secured in any desired adjustment. The adjusting means is shown diagrammatically at 83 and may be of any suitable kind. Its purpose is to enable the apparatus to operate on any size wheel rim as will subsequently appear.

About the pulleys 64 and 82 is passed an endless belt 84, which is loose enough to sag in the manner shown in Fig. 2. This belt serves as a driving means for the wheel rim and also for pressing the cushion tire into its place on the rim when the tire is being applied, and to drive the tire and rim while it is being wrapped. In order to perform these functions it is essential that the belt be drawn tightly between the pulleys so as to straighten its path and make the proper driving connection. For the purpose, on the inside of belt, is mounted an idler pulley 85 which is free to rotate in the outer end of two rocking levers 86 which are secured to a rotary shaft 87 mounted in standards 88 on the base of the machine. To the front end of the shaft 87 is secured an angle lever 89, the end of which is formed with a foot pedal 90. To the angle of the lever 89 is pivotally secured a link which is in turn pivotally fastened at 92 to the end of an angle lever 93 rockingly mounted in the base of the machine at 94 and carrying a foot plate 95. The rear end of the shaft 87 carries an arm 96 between the end of which and the standard is held a spring 97 whose tendency is to maintain the arm 86 raised and the belt 84 slack.

Below the bearings for idler 85, the levers 86 are extended as at 98 and carry a rotatable roll 99, the lower run of the belt passing between the rollers 85 and 99.

By pressure on either pedal 90 or 95, the belt may be tightened between the pulleys 64 and 82 which will bring it in contact with the cushion tire to secure it to the rim and drive the rim. With the lever 79 out of neutral, and in either position the rim and tire will be rotated slowly or rapidly, the former for application of the tire and the latter in the wrapping operation.

It is believed that the operation of applying the tire up to this point will be clear. The size rim being known, the slide is adjusted to the proper height and the pulley 82 at a proper distance; and the rim with the hard cemented base thereon is mounted in the expansible chuck or spider. The cushion tire cut to the proper length is laid in the trough and the guide fingers set to the proper width. The end of the tire 100 is passed between the rim and the pick up roller 101 which gives it an initial pressure and the belt 84 and the rim where the final application is made. The lever 79 is now thrown into the position shown in Fig. 3, and pressure is applied to either pedal 90 or 95. The former action will rotate the pulley 64 at slow speed and the lattter will tighten the belt 84. The tightening of the belt will press the leading end of the tire into close contact with the rim and will rotate the rim and tire slowly in anti-clockwise direction as viewed in Fig. 2. It may be possible to continue the rotation until the tire completely encircles the rim, but it is preferred to stop when the leading end of the tire is at the position shown in Fig. 2. At this point a little less than one-fourth of the tire remains unapplied. It will be noted that the tire is supported throughout its length as it passes on to the rim. This is necessary owing to the fact that the tire is very heavy and if unsupported would sag, and lengthen out of its own weight. It is also essential that the cushion tire be supported with its under surface uppermost, as the under surface of the cushion is given a coating of cement just before being applied to the rim and is very sticky. For this reason the under surface of the cushion must be kept out of contact with any parts of the machine, as not only would the machine become covered with sticky rubber cement, but a bond would not be assumed between the cushion and the hard base where the cement had been removed.

To bring the free end of the tire into contact with the rim it is preferred to make use of the pick-up roller 101 before mentioned. The construction and operation of the pick-up or fastening roller will now be described.

On the bearing or socket 32 is loosely mounted a sleeve or collar 102 which is held in place between the abutment 31 and the boxing 34 of the expansible spider. Integral with the sleeve 102 are two arms, one of which is horizontal in its usual position and is indicated by the reference numeral 103. This arm is extended outwardly and backwardly as shown in Fig. 1, and at its extremity is provided with a handle 104. Along the arm is mounted a slide rod 105 which is guided by a lug 106 near the handle 104 and is encircled by a spring 107 bearing on a lug 108 on the rod and forcing it toward the slide 21. The inner end of the rod extends through the bent portion of the arms 103 at 108' and terminates in a pointed end 109 which may enter a notch 110 formed in the abutment 31 or in a notch 111 formed further around. When in the notch 110 the arm is locked in the position shown in Fig. 2.

A second shorter arm 112 depends from the collar 102 and is slotted as shown at 113. To the slotted arm is adjustably fastened an extension 114, slotted at its upper portion as at 115, the two parts being held in any portion of adjustment by a hand screw 116, this adjustment being provided for operation upon tires of different sizes.

The rotation of the rim having been stopped in the position shown in Fig. 2, the unapplied end of the tire is brought into place by drawing upward on the handle 104 which causes the roller 101 to travel upward about the rim forcing the tire into its place.

The purpose of the pivoted construction of the lower end of the feed chute will now be apparent for as the roller is drawn upwardly a rounded extension 117 on the arm 114 is forced against the part 18 of the rocking end of the chute which causes it to be depressed against the force of the counter-weight 16. In its upper portion the roller 101 may be temporarily locked by engagement of the rod 105 with the notch 111. The roller is held in this position long enough to allow cementing of the rubber tire to the hard base.

The cushion tire is now applied but it is necessary that it be tightly wrapped with several layers of a narrow muslin strip in order to hold the cushion into close engagement with the base and prevent sagging of the tire before it is cured. The part of the apparatus to perform this consists of the fast speed mechanism already described and a tape holding reel and tensioning mechanism.

To the upper end of the standard 19 opposite the arm 80 is secured an upright 118 which extends to a point above the surface of the largest rim to be handled. At the upper end of 118 are secured two parallel guide rods 119 on which is slidably mounted by sleeves 120' a plate 120. At one side of the rod 119 on a spindle 121 in the plate is mounted a reel 122 of muslin for wrapping purposes. Friction drag is applied to the reel 122 by a brake 123 which bears on the upper surface of the reel and is formed with an arm 124 pivotally mounted on a pin 125 secured in an extension of the plate 120 and forced downwardly by a coil spring 126.

From the reel 122 the tape is passed over two or more tension rods 127 which extend from a smaller plate 128 mounted for rotative adjustment by a nut and bolt 129 on the plate 120 opposite the reel. The path of the tape 130 is shown in Fig. 6, and it is evident that its tension may be regulated by adjustment of the plate 128.

The tape is generally narrower than the tire and it is preferable to weave it back and forth over the surface of the tire as it is revolved rapidly. For this purpose the plate 120 is slidably mounted on the rods 119 and it is reciprocated by a lever 131, the lower end of which is pivoted at 132 to the upright 118. Above the pivot 132 the lever carries a link 133, the free end of which is pivotally mounted to a web 134 extending between the sleeves 120' of the plate.

A shelf 135 may be fastened to the upright 19 and form a tool rest.

The operation of the apparatus is believed to be plain from the description which has been given, but a brief review thereof may be beneficial. The tire having been cut and applied in part as explained heretofore, the loose end is brought into position by the pick-up roller. The tire is now ready to be wrapped and for this purpose the tire and rim are given a rapid rotation, the leading end of the muslin having been applied at any point. As the rim rotates the muslin spool or reel is reciprocated slowly on the guide rods which action lays the muslin tightly over the whole surface of the tire. When sufficient tape is applied it is cut off and the free end forced between overlapping layers to hold it from unwrapping. The spider is now contracted and the rim and tire may be stored in some convenient place for curing, the wrappings serving to hold the tire close to the rim and prevent separation until it is placed in the mold.

It is obvious that various changes and modifications may be made in the apparatus shown without departing from the spirit of the invention or sacrificing any of its benefits.

Claims:

1. In an apparatus for applying cushion tires to rims, the combination with a rim carrying spider, a feed table located below the rim, a roller at the end of the feed table, and means for rotating the rim to draw the tire over the table under side uppermost, over the roller and on to the rim.

2. In an apparatus for applying cushion tires to rims, the combination of a feed table, guides in the feed table, a standard adjacent the end of the table, a slide on the standard, a rim carrying spider on the standard, over the end of the feed table, means to adjust the slide and the spider to position rims of different diameters relative to the feed table.

3. An apparatus for applying cushion tires to rims, comprising a feed table, an expansible rim carrying spider located over the delivery end of the feed table, a rotatable and adjustable mounting for said spider, a belt spaced from the rim and adapted to rotate with the tire and the rim, a pulley over which the belt passes and means to adjust the pulley and the mounting to accommodate rims of different diameters.

4. An apparatus of the character described, comprising a rotatable mounting for a rim, means for applying the major portion of the tire to the rim while it rotates and a device movable over the rim adapted to bring the unapplied end of the tire into contact with the rim.

5. An apparatus of the character described, comprising a rotatable mounting for a rim, means for applying the major portion of the tire to the rim while it rotates and a device movable over the rim adapted to bring the unapplied end of the tire into contact with the rim while it is stationary.

6. An apparatus of the character described, comprising a rotatable mounting for a rim, means for applying the major portion of the tire to the rim while it rotates and a pick-up roller adapted to bring the unapplied end of the tire into contact with the rim while it is stationary.

7. An apparatus of the character described, comprising a rim carrying stand, a roller and a tire applying means, guides for the tire in line with the roller and applying means, means for actuating the applying means and rotating the rim for application of the tire, a rocking arm supporting said roller and means for passing the roller around the rim for applying the end of the tire thereto.

8. An apparatus of the character described, comprising a rim carrying stand, a roller and a belt, guides for the tire in line with the roller and belt, means for driving the belt and the rim for application of the tire, a rocking arm supporting said roller and means for passing the roller around the rim for applying the end of the tire thereto.

9. An apparatus of the character described, comprising a rim carrying spider, a rotary mounting for the spider, a feed trough, a roller adjacent the end of the feed trough, a rocking support for the roller concentric with the spider, means for rotating the spider for applying the tire to the rim and means for passing the roller over the tire to apply the free end to the rim.

10. An apparatus of the character described, comprising a rim carrying spider, a rotary mounting for the spider, a feed trough, a roller adjacent the end of the feed trough, a rocking support for the roller concentric with the spider, means for rotating the spider for applying the tire to the rim and a locking device for holding the roller at the end of the trough.

11. An apparatus of the character described, comprising a rim carrying spider, a rotary mounting for the spider, a feed trough terminating adjacent the rim, an arm concentric with the said spider, and terminating in one position at the end of said trough, a roller on the end of said arm, means for moving said arm in an arc, and a locking device for holding said arm at either end of its arc.

12. An apparatus of the character described comprising a rim carrying spider, a rotary mounting for the spider, a feed trough, a roller adjacent the end of the feed trough, a supporting arm for the roller pivotally mounted concentric with the spider, means for adjusting the length of said arm and means for rotating the spider for applying the tire to the rim.

13. An apparatus of the character described, comprising an expansible rim carrying spider, a rotary slidable mounting therefor, a feed trough, a roller adjacent the end of the feed trough, an extensible supporting arm for the roller pivotally mounted on said slide.

14. An apparatus of the character described set forth, comprising a rim carrying spider, means for rotating the rim and applying the tire thereto, a pick-up roller for applying a portion of the tire to the rim, a feed trough in line with the roller and a pivoted extension forming the end of said feed trough.

15. An apparatus of the character described, comprising a rim carrying spider, means for rotating the rim and applying a tire thereto, a rocking arm concentric with said spider, a pick-up roller in the end of said arm, a feed trough, a pivoted extension on said feed trough extending near said roller and said extension being in the path of said arm and rocked thereby.

16. In an apparatus for applying cushion tires, the combination with a rim carrying spider of a feed trough, a roller and a belt in line, the tire passing over said instrumentalities in the order named to be applied to the rim.

17. In an apparatus for applying cushion tires, the combination with a rim carrying spider of a feed trough, a roller and a belt in line, the tire passing over said instrumentalities in the order named to be applied to the rim and a rocking arm carrying and adapted to move the roller over the feed trough and about the rim.

18. The combination of a stand, a rim holding spider on the stand, a feed trough for supplying a cushion tire to the rim, a wrapping supply and means for rotating the rim, 19. The combination of a stand, a rim holding spider on the stand, a feed trough for supplying a cushion tire to the rim, a reel holder, means for rotating the rim and means for reciprocating the reel holder over the tire.

20. The combination of a stand, a rim holding spider on the stand, a feed trough for supplying a cushion tire to the rim, a plate, a reel holder on said plate, tension means on the plate and means for reciprocating the plate.

21. The combination of a stand, a rim holding spider on the stand, a feed trough for supplying a cushion tire to the rim, a plate, a reel holder on said plate, tension means on the plate, means for rotating the rim and means for reciprocating the plate.

22. The combination of a stand, a rim holding spider on the stand, a feed trough supplying a cushion tire to the rim, a plate, a reel holder on said plate, tension means on the plate, means for rotating the rim during the tire application and wrapping and means for reciprocating the plate.

WILLIAM C. STEVENS.

Witnesses:
F. J. SHEA,
M. C. BROWER.